United States Patent
Yagati et al.

(10) Patent No.: US 7,149,976 B2
(45) Date of Patent: Dec. 12, 2006

(54) VIEW MULTIPLEXER FOR USE WITH A VIEWING INFRASTRUCTURE AND A METHOD OF OPERATION THEREOF

(75) Inventors: Lakshman N. Yagati, Chatham, NJ (US); R. Clifford Young, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 545 days.

(21) Appl. No.: 10/119,475

(22) Filed: Apr. 10, 2002

(65) Prior Publication Data

US 2002/0172230 A1 Nov. 21, 2002

Related U.S. Application Data

(60) Provisional application No. 60/283,999, filed on Apr. 16, 2001.

(51) Int. Cl.
*G06F 3/00* (2006.01)
*G06F 15/16* (2006.01)
*G06F 15/173* (2006.01)
*H04J 3/04* (2006.01)

(52) U.S. Cl. .............. 715/744; 715/751; 709/204; 709/223

(58) Field of Classification Search ............... 715/738, 715/740, 734, 744, 751; 709/201, 204, 223; 370/535
See application file for complete search history.

(56) References Cited

U.S. PATENT DOCUMENTS

| | | | | |
|---|---|---|---|---|
| 6,275,575 B1 * | 8/2001 | Wu | ........................ | 379/202.01 |
| 6,304,881 B1 * | 10/2001 | Halim et al. | ................. | 707/201 |
| 6,374,259 B1 * | 4/2002 | Celik | ....................... | 707/104.1 |
| 6,636,873 B1 * | 10/2003 | Carini et al. | ................. | 707/201 |
| 6,654,032 B1 * | 11/2003 | Zhu et al. | .................... | 715/753 |
| 6,711,624 B1 * | 3/2004 | Narurkar et al. | ............. | 719/321 |
| 6,823,373 B1 * | 11/2004 | Pancha et al. | .............. | 709/219 |

* cited by examiner

*Primary Examiner*—Kieu D. Vu
*Assistant Examiner*—Ting Zhou

(57) ABSTRACT

A view multiplexer, a viewing infrastructure and a method of multiplexing a view for use with a service application. In one embodiment, the viewing infrastructure includes a service application, a communications network coupled to the service application, a plurality of viewers coupled to the network and a view multiplexer coupled to both the service application and the communications network. A service coordinator of the view multiplexer simulates a single representative viewer from the plurality of viewers to the service application. A state collaborator, which is coupled to the service coordinator of the view multiplexer, provides a network state to the plurality of viewers.

21 Claims, 2 Drawing Sheets

VIEW MULTIPLEXER FOR USE WITH A VIEWING INFRASTRUCTURE AND A METHOD OF OPERATION THEREOF

CROSS-REFERENCE TO PROVISIONAL APPLICATION

This application claims the benefit of U.S. Provisional Application No. 60/283,999 entitled "Multiplexer That Simulates A Single Client To A Server And A Single Server To Each Of Multiple Viewers" to Yagati, et al., filed on Apr. 16, 2001, which is incorporated herein by reference.

TECHNICAL FIELD OF THE INVENTION

The present invention is directed, in general, to a communications infrastructure and, more specifically, to a communications infrastructure including a view multiplexer and a method of multiplexing a service for use with partitioned applications.

BACKGROUND OF THE INVENTION

Unlike telephones, computers are not universally accessible. For example, a person may not be able to easily use someone else's computer due to the unavailability of data files, the unavailability of certain applications or even established personal preferences. Initially, mainframe and minicomputer users shared a consistent environment in a single, shared system. Though consistent, the shared system was sometimes unresponsive and prevented use of a computer away from the system. In response, the computing industry began emphasizing personal computing. Personal computing allowed users to customize their computer and increase the responsiveness of the computer. The increase in responsiveness, however, came with the cost of a decrease in consistency. In other words, a view at one computer would not be consistent with a view at another computer. The view may be defined as a visible presentation by a computer or a computing device of the state of an application. The state may be defined as the condition of an application on a computer, laptop or another viewer. For example, if editing a document, the state would be the condition of the document.

Networked computing environments seemed to be responsive and also provide an increase in consistency over individual personal computers. The networked computing environments seemed sufficient within a single security domain such as a corporate intranet or university-wide network since such environments do allow users to log into multiple terminals. In addition, remote access tools allow users to dial into or tunnel to their corporate intranet to get access to the networked computing environments. Though these tools continue to improve, remote access still results in added latency or inconsistency.

The growth of the Internet and a new generation of computing devices has further emphasized the need for remote access. Eventually, each person may have many computing devices and each person will expect the multiple and remote devices to work consistently. For example, a person would like to be able to work all day at the office, using a research operating system such as Plan 9 or Linux. At the end of the day, this person may walk away from the office computer with possibly uncommitted changes to a stable storage. On the way home, this person may want to use a wireless personal digital assistant (PDA) or another portable device and continue working on the same project from work with it in the same state as when the person left the office.

Web browsers are available for use that allow a user to view a similar state regardless of which computing device is being used. Web browsers, however, suffer from latency. In addition, Web browsers do not see changes to its state unless the browser program was written to check for changes. In other words, the web browser must poll for changes instead of being informed that there is an update and automatically updating the view.

Some applications are split in two pieces in an attempt to hide the latency of the connection between a user and his data. For example, the Sam text editor has one application piece, the service, that runs near a file system where data editing takes place and a second application piece, the viewer, that runs on whatever computing device is being used. The viewer and the service communicate using a protocol that keeps track of the state of both halves. Sam may provide an increase in responsiveness by performing more work at the second distributed piece of the application which hides the network latency from the user.

Internet Message Access Protocol (IMAP) is another divided application which may hide network latency. IMAP is similar to Sam except IMAP is for electronic mail. IMAP is an example of an application that may display state changes after polling for them. Like Sam, IMAP is simply an application that may be used to hide network latency. Neither Sam or IMAP, however, provide an infrastructure that may support multiple applications.

Accordingly, what is needed in the art is an architecture and method that provides a consistent, responsive view to a wide variety of networked computing devices.

SUMMARY OF THE INVENTION

To address the above-discussed deficiencies of the prior art, the present invention provides a view multiplexer for use with a service application. In one embodiment, the view multiplexer includes a service coordinator coupled to a state collaborator. The service coordinator simulates a single representative viewer of a plurality of viewers to the service application. The state collaborator provides a network state to the plurality of viewers.

In another aspect, the present invention provides a method of multiplexing a view for use with a service application that includes coordinating a plurality of viewers as a single representative viewer to the service application. The method also includes collaborating a network state to the plurality of viewers.

In yet another aspect, the present invention provides a viewing infrastructure that includes a service application, a communications network coupled to the service application, a plurality of viewers coupled to the network and a view multiplexer coupled to both the service application and the communications network. A service coordinator of the view multiplexer simulates a single representative viewer of the plurality of viewers to the service application. A state collaborator, which is coupled to the service coordinator of the view multiplexer, provides a network state to the plurality of viewers.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
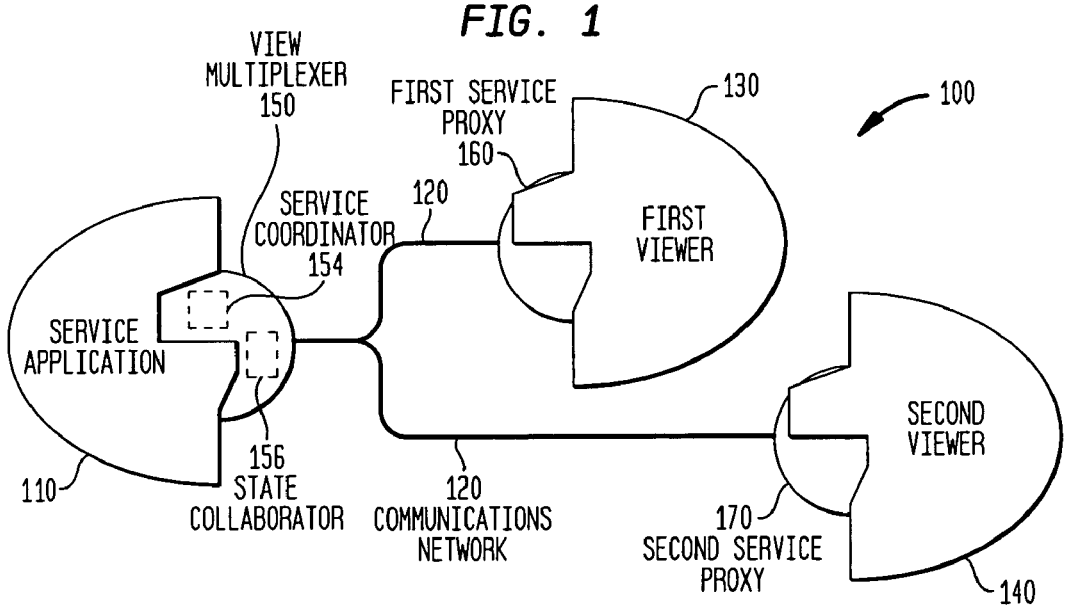
FIG. 1 illustrates a system diagram of an embodiment of a viewing infrastructure constructed in accordance with the principles of the present invention.

Referring initially to FIG. 1, illustrated is a system diagram of an embodiment of a viewing infrastructure, generally designated 100, constructed in accordance with the principles of the present invention. The viewing infrastructure 100 includes a service application 110, a communications network 120, a first viewer 130, a second viewer 140, a view multiplexer 150, a first service proxy 160 and a second service proxy 170. The view multiplexer includes a service coordinator 154 and a state collaborator 156. One skilled in the art will understand that the viewing infrastructure 100 may contain a plurality of viewers with service proxies coupled through the communications network 120 to a plurality of service applications with view multiplexers.

The service application 110 typically runs within a service provider that is highly available, has large and persistent storage resources and has abundant computation cycles. Essentially, the service application 110 may be a computer with application-specific software that is connected to the Internet which provides data storage that may be manipulated elsewhere on the Internet. The service application 110 is responsible for maintaining long-term state for an application. The service application 110 may be, without limitations, a text editor, a drawing program, a jukebox, an address book, a calendar program, a session manager, an image viewer or a map program. The communications network 120 is a conventional communications network coupled to the service application 110. The communications network 120 may be a wireless network, a hardwired network or a combination of both. In one embodiment, the communications network 120 may be the Internet. The communications network 120 is also coupled to the first viewer 130 and the second viewer 140.

The first viewer 130 and the second viewer 140 are computing devices that are capable of connecting to the communications network 120 and have a processor capable of running a sequence of operating instructions. The first viewer 130 or the second viewer 140 may be coupled to the communications network 120 via an Ethernet connection, an IEEE standard 802.11 wireless connection or a 3G cellular wireless connection. The first viewer 130 or the second viewer 140 may also be coupled to the communications network 120 by another type of connection that provides a path for sending data to the service application 110. The first viewer 130 and the second viewer 140 provide an interface with users.

The first viewer 130 or the second viewer 140 may be, without limitations, a personal digital assistant, a desktop computer, a laptop computer or a telephone. The first viewer 130 or the second viewer 140 may also be an embedded computing device or an alternative computing device. An embedded computing device may be a refrigerator, an oven, a dishwasher or another household appliance or device. In addition, the first viewer 130 or the second viewer 140 may be an alternative computing device such as a digital white board or a computing tablet. In some embodiments, the first viewer 130 and the second viewer 140 may be operated simultaneously by different users. In other embodiments, the first viewer 130 and the second viewer 140 may be operated by the same user at different locations and different times.

The view multiplexer 150 is coupled to the service application 110 and the communications network 120. In the illustrated embodiment, the view multiplexer 150 is a sequence of operating instructions implemented on the service application 110. In other embodiments, the view multiplexer 150 may be a sequence of operating instructions implemented on another hardware device separate from the service application 110. In a preferred embodiment, the view multiplexer 150 may be located remotely from the first viewer 130 and the second viewer 140. The view multiplexer 150 includes the service coordinator 154 and the state collaborator 156. The service coordinator 154 simulates the first viewer 130 and the second viewer 140 as a single representative viewer to the service application 110. The state collaborator 156, coupled to the service coordinator, provides a network state to the first viewer 130 and the second viewer 140. One skilled in the art will understand that the state collaborator 156 may also simultaneously maintain and propagate the network state to other active viewers that may be coupled to the viewing infrastructure 100. The viewing infrastructure 100 may support other viewers, in addition to the first viewer 130 and the second viewer 140, on the service application 110, while simulating a connection to a single counterpart to each viewer or service, respectively. The view multiplexer 150 will be discussed in more detail below with respect to FIG. 2.

The network state is preferably not a remote state located on a particular remote machine. Instead, the network state may be managed by the service application 110 coupled to the communications network 120 and may be usable on any viewer connected to the communications network 120. Network state provides a better abstraction since it changes the world-view from one where the user manages a collection of distributed, out-of-sync machines to one where a service application houses the network state in a reliable, backed-up, highly available environment. The network state, therefore, may allow a system of computers worldwide to provide universal data service, just as a telephone system provides universal telephone service. The network state may be maintained by the service application 110. In one embodiment, the network state may be implemented by multiple service applications providing a distributed fault-tolerant control system.

The first service proxy 160 and the second service proxy 170 are coupled to the communications network 120 and the first viewer 130 and the second viewer 140, respectively. The first service proxy 160 and the second service proxy 170 may provide responsiveness for the viewing infrastructure 100 by hiding latency of the communications network 120.

In the illustrated embodiment, the first service proxy 160 and the second service proxy 170 are typically a sequence of operating instructions implemented on the first viewer 130 and the second viewer 140, respectively. In other embodiments, the first service proxy 160 and the second service proxy 170 may be a sequence of operating instructions implemented on a device separate from the first viewer 130 or the second viewer 140. If on a separate device, the first service proxy 160 and the second service proxy 170 may still be located proximate the first viewer 130 and the second viewer 140 in order to reduce latency. The first service proxy 160 and the second service proxy 170 may permit a user to customize a partitioned application to adapt to local features and limitations of viewers such as the first viewer 130 and the second viewer 140.

A partitioned application is generally an application that has been divided into multiple parts. The first part of the partitioned application may run in a reliable, maintained environment such as the service application 110. The second part of the partitioned application may run in a viewer, such as the first service proxy 160 or the second service proxy 170 of the first viewer 130 and the second viewer 140, respectively. The first part of the partitioned application generally manages the state of the partitioned application and the second part manages the user interfaces. The protocol between the first and second part is typically designed to hide latency and conserve bandwidth. Usually, a full-duplex connection couples the multiple parts of the partitioned application.

A partitioned application allows for an abstraction layer between the multiple parts. Additionally, partitioned applications provide a simple approach to programming language and operating system compatibility. This allows designers to build on any platform with any programming language and any operating system.

In a partitioned application, a system may respond to user input with a local, a spooled or a Remote Procedure Call (RPC) response. In a local case, a viewer may handle the response completely. While this is responsive, this case may be inconsistent since no message, for example a request, is sent to a service application to update the network state. In the spool case, a viewer may send a message to a service application but expect no return message, such as a reply. This case may be responsive and consistent, but it often requires a viewer to have sufficient processing capability. The third case, RPC, a viewer may send a message to a service application and expect a reply. This case is generally unresponsive, but synchronously consistent.

In an advantageous embodiment, the first service proxy 160 may hide the second viewer 140 and the service application 110 from the first viewer 130 by combining them into what appears to be a single service application to the first viewer 130. The first service proxy 160 may simulate a capricious service application that occasionally makes arbitrary changes to the network state. In this embodiment, viewer exits, viewer start-up and READ/REPLY traffic to and from the second viewer 140 are typically not visible to the first viewer 130, but ACKNOWLEDGMENTs to the second viewer 140 may arrive as UPDATEs to be handled. In some embodiments, a service proxy may not be resident on each viewer. Instead, each viewer itself may contain the appropriate subsystems to provide the function of the service proxy.

The viewing infrastructure 100 is designed to provide mechanisms to hide latency by allowing the first viewer 130 or second viewer 140 to make network state changes locally without waiting for the change to travel to the service application 110 and back. In addition, the viewing infrastructure 100 supports multiplexing the first viewer 130 and the second viewer 140 to the service application 110. The viewing infrastructure 100 also provides the illusion to the first viewer 130 and the second viewer 140 or the service application 110 that each one is connected to a single service application or a viewer, respectively.

The viewing infrastructure 100 may use a simple low-level packet format that indicates message length and type. The libraries of particular platforms which may be implemented on the first viewer 130 and the second viewer 140 facilitate reading and writing messages there between. The low-level packet format may allow the viewing infrastructure 100 to correctly route messages. The viewing infrastructure 100 does not need to know the semantics of the body of a spooled, RPC, or update message. Instead, the viewing infrastructure 100 should know which kind of message is being sent. The low-level packet format, therefore, often differs from an application-specific protocol which may be specified by the application designer.

In an advantageous embodiment, the viewing infrastructure 100 may provide three types of requests initiated from the first viewer 130 or the second viewer 140. The requests, READs, WRITEs, and DELEGATES, may have three valid types of replies, REPLYs, ACKNOWLEDGMENTs, and NONACKNOWLEDGMENTs. The READ requests generally retrieve network state information from the service application 110. The READs are typically succeeded and answered by REPLY messages. Most commonly, READ messages may be used to initialize the first viewer 130 or the second viewer 140. The initializing message may be a READ, while the initializing response may be a REPLY.

The viewing infrastructure 100 may use WRITE requests to change the network state. WRITE requests may fail but if a WRITE request is successful, then the first viewer 130 or the second viewer 140 may receive an ACKNOWLEDGMENT reply. If the WRITE is not successful, then the first viewer 130 or the second viewer 140 may receive a NONACKNOWLEDGMENT reply. If the first viewer 130 or the second viewer 140 viewer receive an ACKNOWLEDGMENT, then the first viewer 130 or second viewer 140 may update the local copy of the network state. WRITEs may be constrained so that computations are not required by the service application 110. In other words, the first viewer 130 or the second viewer 140 may send a WRITE already knowing the resulting network state if the WRITE succeeds. For example, a "Change" message may be a WRITE request.

The viewing infrastructure 100 may use DELEGATE requests to perform computations by the service application 110 in order to change the network state. Like WRITEs, DELEGATE requests may fail and may be acknowledged by either an ACKNOWLEDGMENT or a NONACKNOWLEDGMENT reply. To the first viewer 130 or the second viewer 140, the READ, WRITE, and DELEGATE interactions may look like RPCs in which the first viewer 130 or the second viewer 140 sends a message, and a response comes back from the service application 110. WRITEs, however, may actually be implemented through spooled message interactions, and READs and DELEGATEs implemented as RPCs.

In addition to acknowledgments of requests, the first viewer 130 or the second viewer 140 may receive two types of asynchronous messages. The UPDATE message may allow the viewing infrastructure 100 to tell the first viewer 130 or the second viewer 140 that the network state has changed. For example, the first viewer 130 may receive an ACKNOWLEDGMENT and the second viewer 140 may receive an UPDATE that is a copy of the original ACKNOWLEDGMENT.

BROADCAST messages may let the service application 110 notify the first viewer 130 or the second viewer 140 of a change to the network state by the service application 110. For example, a jukebox application may use broadcast messages to stream music to the first viewer 130 or the second viewer 140. A message type may determine where the message is routed. READ/REPLY message pairs may be entirely private between the first viewer 130 and the service application 110. Similarly, NONACKNOWLEDGMENT responses either to WRITEs or to DELEGATEs may only be directed to the second viewer 140 since the second viewer 140 made the failed request. In contrast, positive responses are made visible to both the first viewer 130 and the second viewer 140 as sharing the service application 110, in the form of ACKNOWLEDGMENTs to the requester, which may be the first viewer 130, and then UPDATEs to the second viewer 140. This may allow either the first viewer 130 or the second viewer 140 to keep abreast of network state changes that did not initiate there. In the viewing infrastructure 100, the first service proxy 160 and the second service proxy 170 may work together with the view multiplexer 150 to provide transparent viewer multiplexing and latency hiding. In an advantageous embodiment, the viewing infrastructure 100 may hide latency to the first viewer 130 by allowing the first viewer 130 to become privileged in making state changes. For example, the first service proxy 160 may be called a token holder, which generates fast ACKNOWLEDGMENTs to WRITE requests from the first viewer 130. When the first viewer 130 as the privileged viewer issues a WRITE, the first service proxy 160 as the token holder immediately acknowledges the WRITE and sends an UPDATE to the view multiplexer 150. The view multiplexer 150 then propagates that UPDATE message to the second viewer 140 and to the service application 110.

If an unprivileged viewer, such as the second viewer 140 in this example, attempts a WRITE, then its service proxy, the second service proxy 170, must first acquire the token from the service application 110 before performing the WRITE. The protocol for acquiring the token requires sending a token request message from the second service proxy 170 to the view multiplexer 150. The view multiplexer 150 then requests the token from the first service proxy 160, which may be obligated to release it. Once the view multiplexer 150 has recovered the token, it grants the token to the requestor, the second service proxy 170, which is then free to handle the WRITE request. Using this scheme, the majority of network state changes may be handled immediately by the privileged token service proxy, thus hiding the communications network 120 latency.

The first service proxy 160 and the second service proxy 170 may also handle the correctness issues for UPDATEs that arrive between the time that a non-privileged viewer, for example second viewer 140, WRITEs and the token arrives. Typically, the second viewer 140 applies the UPDATEs to reflect the network state, resulting in the attempted WRITE being based on stale data. The second service proxy 170 monitors the stream of messages from the service application 110 to the second viewer 140, and generates a NONACKNOWLEDGMENT to the stale WRITE when the token arrives. The second viewer 140 is then free to retry the WRITE, with a higher chance of success since the token is now local.

The token-based fast acknowledgment system may work when the valid ACKNOWLEDGMENT or NONACKNOWLEDGMENT responses to a WRITE look exactly like the original WRITE message (albeit with the message type altered), and the service application 110 sends an ACKNOWLEDGMENT for every WRITE that the token holder has issued. Since one viewer may be privileged at a time, the viewing infrastructure 100 may implement WRITEs using a spooled approach rather than an RPC. The token allows the commit point in the viewing infrastructure 100 to move next to the privileged viewer, for example the first viewer 130. The token allows its holders, the privileged viewer, to commit changes to the network state. This may allow the token holder or privileged viewer to proceed ahead of the service application 110, and the service application 110 will hold some previous state of the token holder while the UPDATEs are in flight. In a preferred embodiment, the token is not visible to the first viewer 130 or second viewer 140 or the service application 110, but moves among the view multiplexer 150, the first service proxy 160 and the second service proxy 170.

Figure 2:
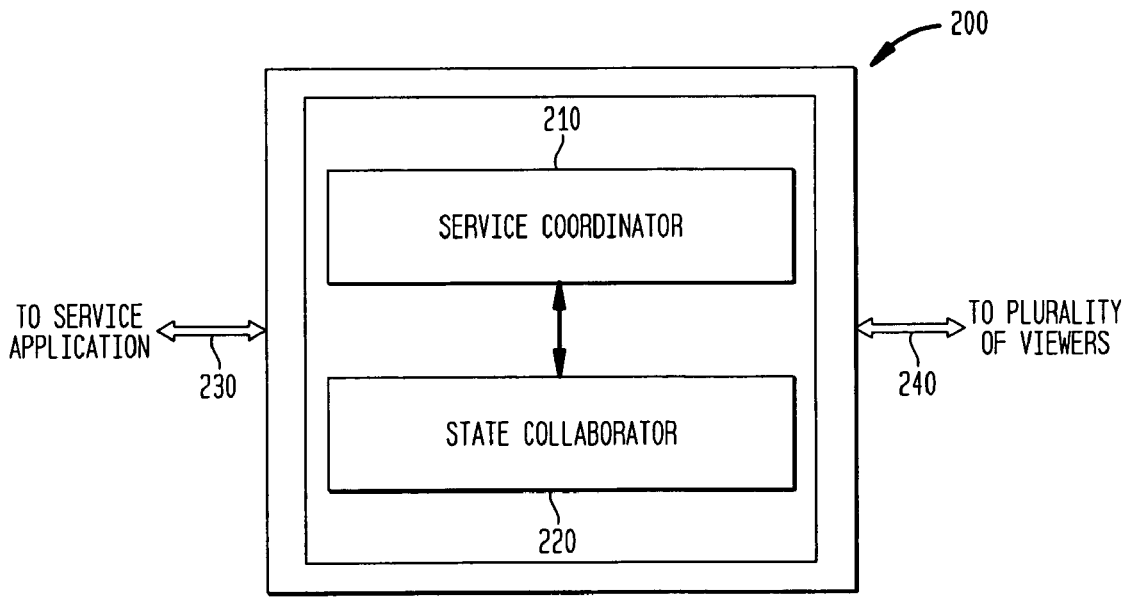
FIG. 2 illustrates a block diagram of an embodiment of a view multiplexer constructed in accordance with the principles of the present invention.

Turning now to FIG. 2, illustrated is a block diagram of an embodiment of a view multiplexer, generally designated 200, constructed in accordance with the principles of the present invention. The view multiplexer 200, including a service coordinator 210 and a state collaborator 220, is coupled to a service application, and a plurality of viewers.

The service coordinator 210 is coupled to the state collaborator 220. Typically, the service coordinator 210 is embodied in a sequence of operating instructions implemented within the view multiplexer 200. The service coordinator 210 hides viewer connections and disconnections from the service application by acting as a single viewer that is always active. In an advantageous embodiment, the view multiplexer 200 is coupled to a service application through the service coordinator 210.

The state collaborator 220, like the service coordinator 210, is also typically embodied in a sequence of operating instructions implemented within the view multiplexer 200. The state collaborator 220 propagates any changes to the network state to the plurality of viewers so that a consistent network state may eventually be viewed by the plurality of viewers and the service application. The state collaborator 220 may maintain a list of active viewer connections to assist in providing the network state to the plurality of viewers. In one embodiment, the state collaborator 220 may provide the network state to a plurality of viewers by multicasting. One skilled in the art will understand multicasting to a plurality of viewers. In an advantageous embodiment, the state collaborator 220 may provide the network state by propagating UPDATE and BROADCAST messages to the plurality of viewers.

The coupling to a service application 230 provides a connection between a service application to the view multiplexer 200. The coupling to a service application 230 may be implemented in many ways depending on the implementation of the view multiplexer 200. For example, the view multiplexer 200 may be a sequence of operating instructions implemented on a hardware device that is separate from the service application. In this embodiment, the service application may be coupled to the view multiplexer via a conventional hardwired connection. In another embodiment, the view multiplexer 200 may be a sequence of operating instructions implemented on the service application itself. The coupling of the view multiplexer to the service application may be provided by a wireless or switched data connection. In a preferred embodiment, the view multiplexer 200 may be located remotely from the plurality of viewers. Typically, the view multiplexer 200 is located proximate to the service application. In an advantageous embodiment, the service application may be a text editor, a drawing program, a jukebox, an address book, a calendar program, a session manager, an image viewer, a map program or other applications.

The coupling to a plurality of viewers 240 provides a connection from the view multiplexer 200 to the plurality of viewers. In some embodiments, the coupling to a plurality of viewers 240 may be coupled through a service proxy instead of directly connected to a viewer. In an advantageous embodiment, the plurality of viewers may be a personal digital assistant, a desktop computer, an embedded computing device, an alternative computing device, a laptop computer or a telephone. The plurality of viewers may operate simultaneously. Typically, the plurality of viewers 240 are coupled to the state collaborator 220 of the view multiplexer 200 by a communications network, which may be either wireless, hardwired or a combination of both. In an advantageous embodiment, a plurality of viewers may be coupled to the view multiplexer 200 via the Internet employing a TCP/IP connection. At some point, one of the plurality of viewers 240 may be disconnected from the view multiplexer 200. In these cases, another viewer may be able to connect to the service application and accommodate the network state.

Figure 3:
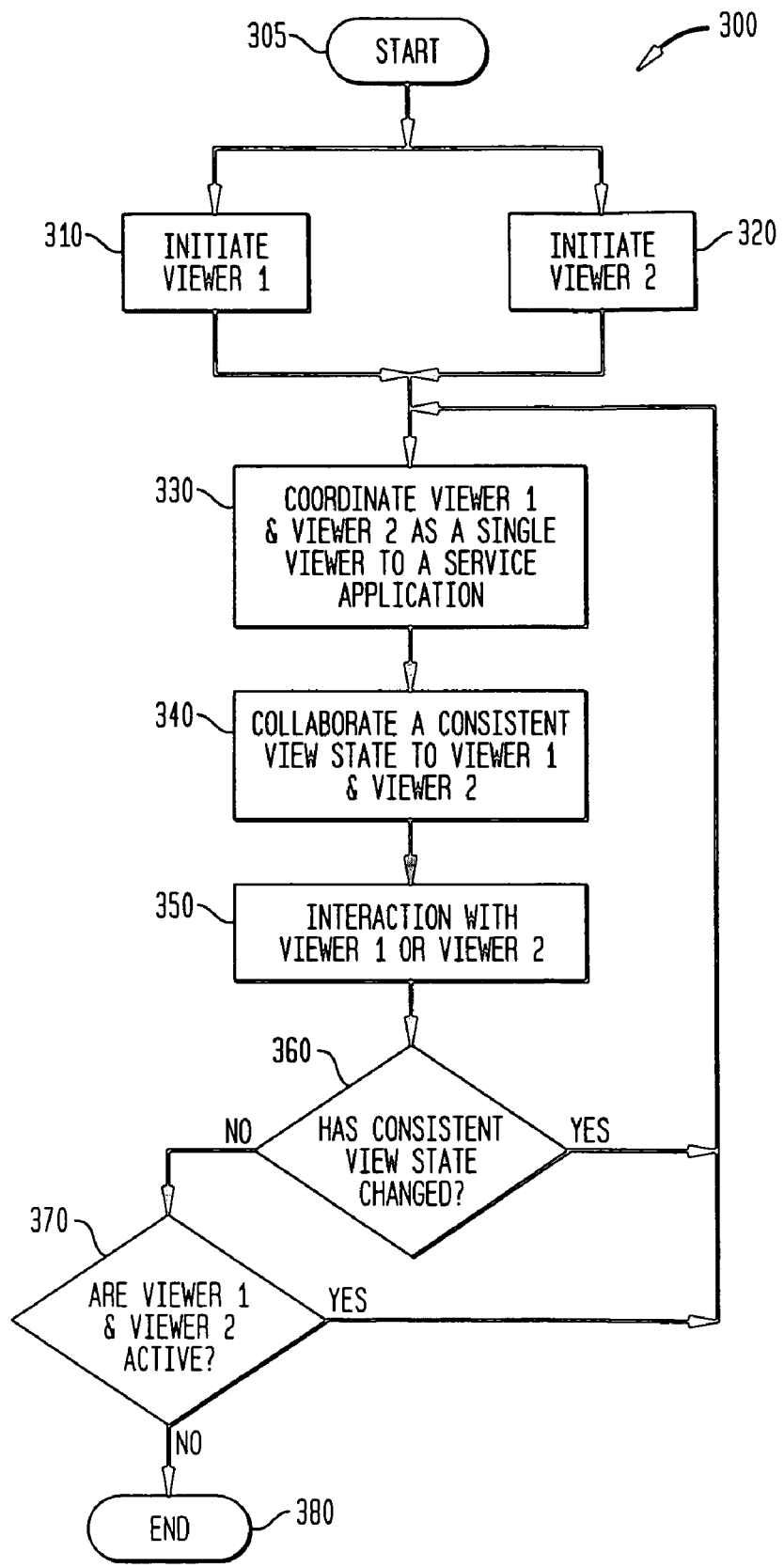
FIG. 3 illustrates a flow diagram of an embodiment of a method of multiplexing a view for use with a service application, constructed in accordance with the principles of the present invention.

Turning now to FIG. 3, illustrated is a flow diagram of an embodiment of a method of multiplexing a view for use with a service application, generally designated 300, constructed in accordance with the principles of the present invention. The method 300 starts in a step 305 with an intent to multiplex a view for use with a service application.

Following a step 305, a viewer 1 is initiated in a step 310. A viewer may be initiated when used by a user to connect to a service application. A viewer may connect to a service application through a service proxy. The service proxy may connect to a process at the service application which monitors at a known port. After authentication, the service proxy may send a DELEGATE request to the process requesting the address of the service application. The request may be a string formed from the user's name, the identification of a session, or name of the service application. The process may keep a list of currently active service applications, which may be indexed by name. When the process receives a request from a viewer, it may look up the service and return the service's IP address and port in an ACKNOWLEDGMENT reply to the viewer. The service proxy then uses this address to contact the view multiplexer of the service application.

A viewer 2 is then initiated in a step 320. The viewer 2 may be initiated in the same manner as the viewer 1. The viewer 2 may be initiated simultaneously with the viewer 1 or even before the viewer 1. In an advantageous embodiment, the viewer 2 may be initiated by the same user that initiated viewer 1. For example, a user may initiate the viewer 1 at his office and then initiate viewer 2 later at his home. Both the viewer 1 and the viewer 2 may be a personal digital assistant, a desktop computer, an embedded computing device, an alternative computing device, a laptop computer, or a telephone.

After the viewer 1 and viewer 2 are initiated, a view multiplexer coordinates viewer 1 and viewer 2 as a single viewer to a service application in a step 330. The view multiplexer may coordinate a single viewer to the service application by simulating viewer 1 and viewer 2 as a single viewer. By simulating a single viewer, the service application may be written to respond to a single viewer. As discussed previously with respect to FIG. 1 and FIG. 2, the service application may be a text editor, a drawing program, a jukebox, an address book, a calendar program, a session manager, an image viewer or a map program. Typically, the service application is remotely located from viewer 1 and viewer 2 and the view multiplexer is proximate the service application. In this embodiment, the view multiplexer performs coordinating remotely from viewer 1 and viewer 2.

A view multiplexer also collaborates a network state to viewer 1 and viewer 2 in a step 340. In collaborating, the view multiplexer maintains the network state and propagates any changes to the network state to both viewer 1 and viewer 2. By collaborating, the view multiplexer may allow a single user to access the network state from either viewer 1 or viewer 2. In a preferred embodiment, collaborating is performed via a communications network such as the Internet.

Next, an interaction with viewer 1 or viewer 2 occurs in a step 350. An interaction occurs when a user interfaces with viewer 1 or viewer 2. These interactions may change the network state or not. Viewer 1 may display a network state of the service application which may be a text editor. The user may make stylistic changes to the view on viewer 1 that does not affect the network state. For example, the user may simply change the view on viewer 1 from a page view to an outline view. In this example, however, the view on viewer 1 has simply changed. The network state remains unchanged.

After an interaction occurs, a view multiplexer determines if a network state has changed in a first decisional step 360. The view multiplexer may determine if the network state has changed by receiving or not receiving WRITE requests as discussed above with respect to FIG. 1.

After determining that a network state has not changed, the view multiplexer determines if viewer 1 and viewer 2 are still active in a second decisional step 370. The view multiplexer may determine if viewer 1 and viewer 2 are active by using a timer to determine the amount of time between messages received from either viewer 1 or viewer 2 is equal to or greater than a predetermined amount. Finally, multiplexing a view ends in a step 380.

Returning now to the first decisional step 360, if the view multiplexer determines the network state has changed, then the method 300 continues to the step 330. A change to the network state may occur when a user adds or deletes text to the text editor program. The change to the network state may be propagated even though the change has not been saved by the user. At the second decisional step 370, if the view multiplexer determines that viewer 1 and viewer 2 are active, then the method 300 continues to the step 330.

Although the present invention has been described in detail, those skilled in the art should understand that they can make various changes, substitutions and alterations herein without departing from the spirit and scope of the invention in its broadest form.

We claim:

1. A view multiplexer implemented on a computing device, for use with a service application, comprising:
    a service coordinator configured to simulate a single representative viewer to said service application from a plurality of viewers, said service application configured to communicate with a single viewer; and
    a state collaborator, coupled to said service coordinator, configured to automatically provide a network state of said service application to said plurality of viewers and said service application based on message types indicated by a low-level packet format, said low-level packet format employed by said plurality of viewers and independent of said service application.

2. The view multiplexer as recited in claim 1 wherein any one of said plurality of viewers is designated to change said network state.

3. The view multiplexer as recited in claim 1 wherein said plurality of viewers are configured to operate simultaneously.

4. The view multiplexer as recited in claim 1 wherein said service application includes one selected from the group consisting of:
   a text editor,
   a drawing program,
   a jukebox,
   an address book,
   a calendar program,
   a session manager,
   an image viewer, and
   a map program.

5. The view multiplexer as recited in claim 1 wherein said view multiplexer is located remotely from said plurality of viewers via a communications network and a change of said network state occurs at one of said plurality of viewers effectuating said change independent of a latency associated with said communications network.

6. The view multiplexer as recited in claim 1 wherein said service coordinator and said state collaborator are configured to employ a protocol independent of said service application to simulate said single representative viewer and provide said network state.

7. The view multiplexer as recited in claim 1 wherein said service application is a partitioned application and said view multiplexer is coupled to a service proxy associated with at least one of said plurality of viewers, said service proxy including a portion of said partitioned service application configured to manage user interface therewith.

8. The view multiplexer as recited in claim 1 wherein said message types are requests and replies, wherein said requests are READ, WRITE and DELEGATE and said replies are REPLY, ACKNOWLEDGE and NONACKNOWLEDGE.

9. A method of multiplexing a view for use with a service application comprising:
   coordinating a plurality of viewers to simulate a single representative viewer to said service application, said service application configured to communicate with a single viewer; and
   automatically collaborating a network state of said service application to said plurality of viewers and said service application, said coordinating and collaborating based on message types indicated by a low-level packet format employed by said plurality of viewers and independent of said service application.

10. The method as recited in claim 9 wherein any one of said plurality of viewers is designated to change said network state.

11. The method as recited in claim 9 wherein said plurality of viewers are operated simultaneously.

12. The method as recited in claim 9 wherein said service application includes one selected from the group consisting of:
   a text editor,
   a drawing program,
   a jukebox,
   an address book,
   a calendar program,
   a session manager,
   an image viewer, and
   a map program.

13. The method as recited in claim 9 wherein said automatically collaborating said network state includes propagating a change of said network state regardless if said change has been saved.

14. The method as recited in claim 9 wherein said message types are requests and replies, wherein said requests are READ, WRITE and DELEGATE and said replies are REPLY, ACKNOWLEDGE and NONACKNOWLEDGE.

15. A viewing infrastructure, comprising:
   a service application implemented on a computing device;
   a communications network coupled to said service application;
   a plurality of viewers coupled to said network;
   a computer implemented view multiplexer coupled to said service application and said communications network, including:
      a service coordinator configured to simulate a single representative viewer to said service application from said plurality of viewers, said service application configured to communicate with a single viewer, and
      a state collaborator, coupled to said service coordinator, that automatically provides a network state of said service application to said plurality of viewers and said service application based on message types indicated by a low-level packet format, said low-level packet format employed by said plurality of viewers and independent of said service application.

16. The viewing infrastructure as recited in claim 15 wherein any one of said plurality of viewers is designated to change said network state.

17. The viewing infrastructure as recited in claim 15 wherein said plurality of viewers are operated simultaneously.

18. The viewing infrastructure as recited in claim 15 wherein said service application includes one selected from the group consisting of:
   a text editor,
   a drawing program,
   a jukebox,
   an address book,
   a calendar program,
   a session manager,
   an image viewer, and
   a map program.

19. The viewing infrastructure as recited in claim 15 wherein said view multiplexer is located remotely from said plurality of viewers via a communications network and a change of said network state occurs at one of said plurality of viewers effectuating said change independent of a latency associated with said communications network.

20. The viewing infrastructure as recited in claim 15 wherein said service coordinator and said state collaborator are configured to employ a protocol independent of said service application to simulate said single representative viewer and provide said network state.

21. The viewing infrastructure as recited in claim 15 further comprising a service proxy associated with each of said plurality of viewers, wherein said service application is a partitioned application and each of said service proxy includes a portion of said partitioned service application configured to manage user interface therewith.

* * * * *